US009882906B2

(12) United States Patent
Bianchi et al.

(10) Patent No.: US 9,882,906 B2
(45) Date of Patent: Jan. 30, 2018

(54) RECOMMENDATION SCHEMA FOR STORING DATA IN A SHARED DATA STORAGE NETWORK

(71) Applicant: International Business Machines Corporation, Armonk, NY (US)

(72) Inventors: Silvia C. S. Bianchi, Sao Paulo (BR); Heloisa C. S. P. Candello, Campinas (BR); Renato L. F. Cunha, Sao Paulo (BR); Claudio S. Pinhanez, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/568,237

(22) Filed: Dec. 12, 2014

(65) Prior Publication Data

US 2016/0173499 A1      Jun. 16, 2016

(51) Int. Cl.
*G06F 12/14*      (2006.01)
*H04L 29/06*      (2006.01)
*H04L 29/08*      (2006.01)

(52) U.S. Cl.
CPC .......... *H04L 63/10* (2013.01); *H04L 67/1057* (2013.01); *H04L 67/104* (2013.01); *H04L 67/1097* (2013.01)

(58) Field of Classification Search
CPC .. F41H 13/00; F41H 13/0093; G06F 11/2094; G06F 21/56; G06F 21/562; G06F 21/577; G06F 21/51; G06F 21/57; G06F 21/645; G06F 11/08; G06F 11/1076; G06F 11/167; G06F 21/55; G06F 21/554; G06F 21/556; G06F 2221/2143; G06Q 10/06; G06Q 10/10; G06Q 10/107; G06Q 50/18; H04L 63/0227; H04L 67/1095; H04L 63/10; H04L 67/104; H04L 63/123; H04L 63/0823; H04L 63/105; H04L 63/12; H04L 9/3268
USPC ......................................................... 726/26
See application file for complete search history.

(56) References Cited

U.S. PATENT DOCUMENTS

| 7,213,047 | B2 | 5/2007 | Yeager et al. |
| 7,275,102 | B2 | 9/2007 | Yeager et al. |
| 7,877,353 | B2 | 1/2011 | Ahmed et al. |
| 7,886,034 | B1 | 2/2011 | Hartmann et al. |

(Continued)

FOREIGN PATENT DOCUMENTS

| CN | 101345753 B | 5/2011 |
| WO | 0265329 A1 | 8/2002 |

(Continued)

OTHER PUBLICATIONS

Caronni, Germano, "Walking the Web of Trust", Sun Microsystems Laboratories, Palo Alto, pp. 153-158, © 2000 IEEE.

*Primary Examiner* — Kambiz Zand
*Assistant Examiner* — Abiy Getachew
(74) *Attorney, Agent, or Firm* — Stephen R. Yoder

(57) ABSTRACT

A shared data storage network, such as a peer-to-peer network, is managed according to individual member trust level. Members of the storage network make their local storage available to other members of the network. Members receive a storage-location recommendation based on (i) the type of data to be stored, and (ii) an individual trust level assigned to members providing storage resources in the network.

20 Claims, 6 Drawing Sheets

(56) References Cited

U.S. PATENT DOCUMENTS

| | | |
|---|---|---|
| 8,051,205 B2 | 11/2011 | Roy et al. |
| 8,108,536 B1 * | 1/2012 | Hernacki ............... G06F 21/51 |
| | | 709/201 |
| 8,239,492 B2 | 8/2012 | Pottenger |
| 8,255,736 B2 | 8/2012 | Agundez Dominguez et al. |
| 8,266,284 B2 | 9/2012 | Iverson |
| 8,280,958 B2 | 10/2012 | Chavez et al. |
| 8,281,023 B2 | 10/2012 | Dondeti et al. |
| 8,296,398 B2 | 10/2012 | Lacapra et al. |
| 8,307,026 B2 | 11/2012 | Gusler et al. |
| 8,316,098 B2 | 11/2012 | Luna et al. |
| 8,352,692 B1 | 1/2013 | Jordan |
| 8,356,080 B2 | 1/2013 | Luna et al. |
| 8,364,605 B2 | 1/2013 | Rosenthal et al. |
| 8,364,758 B2 | 1/2013 | Hydrie et al. |
| 8,458,172 B2 | 6/2013 | Gerber et al. |
| 8,499,150 B1 * | 7/2013 | Nachenberg ........ H04L 9/3268 |
| | | 713/156 |
| 8,862,665 B2 * | 10/2014 | Murphy ............... H04L 63/123 |
| | | 709/204 |
| 2005/0132229 A1 * | 6/2005 | Zhang ............... H04L 12/4641 |
| | | 726/4 |
| 2009/0157814 A1 | 6/2009 | Lee et al. |
| 2011/0010533 A1 | 1/2011 | Buford et al. |
| 2012/0221636 A1 | 8/2012 | Surtani et al. |
| 2012/0259953 A1 | 10/2012 | Gertner |
| 2012/0278859 A1 | 11/2012 | Bansal et al. |
| 2012/0291137 A1 | 11/2012 | Walsh et al. |
| 2012/0311339 A1 | 12/2012 | Irvine |
| 2013/0007218 A1 | 1/2013 | Shah et al. |
| 2013/0097057 A1 | 4/2013 | Vaquero Gonzalez et al. |
| 2014/0123292 A1 * | 5/2014 | Schmidt ............... H04L 67/10 |
| | | 726/25 |
| 2014/0153706 A1 * | 6/2014 | Boone, Jr. ............ H04M 11/066 |
| | | 379/93.01 |
| 2016/0021187 A1 | 1/2016 | Ying et al. |

FOREIGN PATENT DOCUMENTS

| | | |
|---|---|---|
| WO | 0289488 A1 | 11/2002 |
| WO | 2004019158 A3 | 3/2004 |
| WO | 2004046969 A1 | 6/2004 |
| WO | 2005062572 A1 | 7/2005 |
| WO | 2007053727 A2 | 5/2007 |
| WO | 2007100509 A1 | 9/2007 |
| WO | 2007112150 A2 | 10/2007 |
| WO | 2008016442 A3 | 2/2008 |
| WO | 2008103991 A3 | 8/2008 |
| WO | 2009002835 A3 | 12/2008 |
| WO | 2009012044 A1 | 1/2009 |
| WO | 2009142851 A3 | 11/2009 |
| WO | 2011029364 A1 | 3/2011 |
| WO | 2012018998 A1 | 2/2012 |
| WO | 2012093835 A3 | 7/2012 |
| WO | 2013101084 A1 | 7/2013 |

\* cited by examiner

RECOMMENDATION SCHEMA FOR STORING DATA IN A SHARED DATA STORAGE NETWORK

BACKGROUND OF THE INVENTION

The present invention relates generally to the field of data security and more particularly to storing data in a shared data storage environment.

A shared resource, or network share, is a computer resource made available from one host to other hosts on a computer network. It is a device or piece of information on a computer that can be remotely accessed from another computer, typically via a local area network or an enterprise intranet. Access is generally transparent, as if it were a resource in the local machine. Network sharing is made possible by inter-process communication over the network.

Peer-to-peer (P2P) computing or networking is a distributed application architecture that partitions tasks or workloads between peers. Peers are equally privileged, equipotent participants in the application. They are said to form a peer-to-peer network of nodes. Peers make a portion of their resources, such as disk storage, directly available to other network participants, without the need for central coordination by servers or stable hosts. Peers are both suppliers and consumers of resources, in contrast to the traditional client-server model in which the consumption and supply of resources is divided.

SUMMARY

In one aspect of the present invention, a method, a computer program product, and a system includes: (i) determining a trust level associated with a file to be stored in a network accessible storage device, (ii) identifying a set of remote storage locations within a networked computer system, and (iii) determining a subset of remote storage locations, each storage location having a corresponding trust level, the determination based, at least in part, on the trust level associated with the file to be store in the remote storage location. The trust level is one of a set of trust levels including a lower level and an upper level, each trust level indicating trustworthiness, the upper level being more trustworthy than the lower level. The subset of remote storage locations including remote storage locations within the set of remote storage locations having a corresponding trust level that is equal to or greater than the trust level associated with the file to be stored.

DETAILED DESCRIPTION

Figure 1:
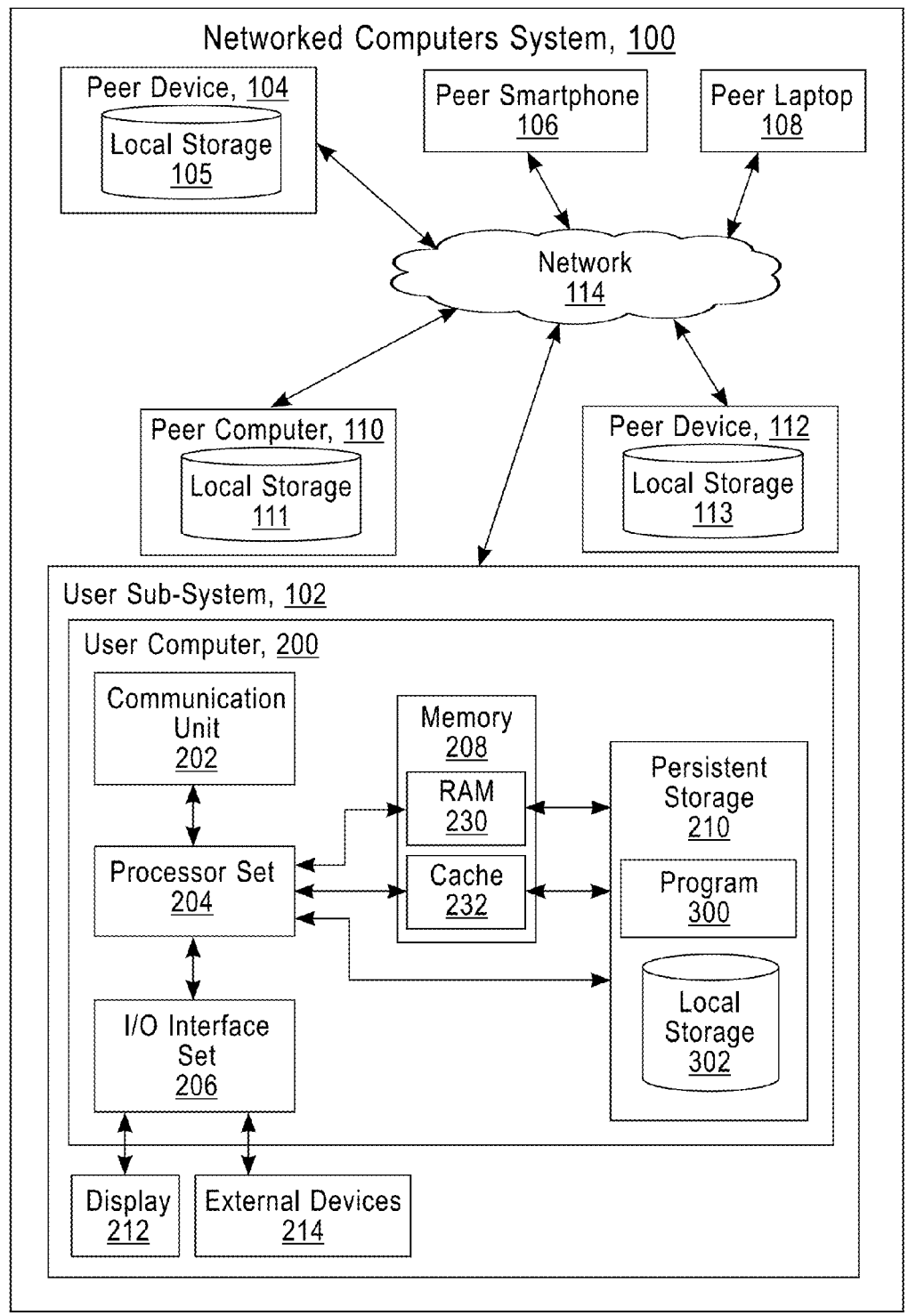
FIG. 1 is a schematic view of a first embodiment of a system according to the present invention.

A shared data storage network, such as a peer-to-peer network, is managed according to individual member trust level. Members of the storage network make their local storage available to other members of the network. Members receive a storage-location recommendation based on (i) the type of data to be stored, and (ii) an individual trust level assigned to members providing storage resources in the network. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: user sub-system 102; peer devices 104, 112; peer smart phone 106; peer laptop 108; peer computer 110; local storage 105, 111, 113, 302; communication network 114; user computer 200; communication unit 202; processor set 204; input/output (I/O) interface set 206; memory device 208; persistent storage device 210; display device 212; external device set 214; random access memory (RAM) devices 230; cache memory device 232; storage program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with user computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Storage program 300 operates to recommend potential storage locations within the data storage network for data storage based, at least in part, on two criteria: (i) specified data type; and (ii) individual trust level of the local network storage of peers within the network. Trust level is associated with factors that may include, but are not limited to: (i) fellow peer feedback; (ii) social link interaction; (iii) connected peers using peer storage; (iv) social distance; (v) social relationship; (vi) peer device information; (vii) peer device applications; (viii) enterprise information; (ix) reported hardware issues; (x) reported software issues; (xi) peer work location; (xii) peer behavior patterns with respect to the peer's device; (xiii) peer travel frequency; (xiv) peer travel destinations; (xv) peer employment role (such as trainee, junior manager, staff engineer); (xvi) data encryption; (xvii) password type; (xviii) password security level; (xix) password strength; (xx) malware detection applications (for example: application provider, application's permissions); (xxi) virus detection applications (anti-virus software); and/or (xxii) backup systems (for example: backup destination, backup source disks, backup source partitions, backup frequency).

Some embodiments of the present invention recognize the following facts, potential problems and/or potential areas for improvement with respect to the current state of the art: (i) one of the main challenges in employee-to-employee storage systems is determining with which peers in the network to store data; (ii) peer-to-peer storage systems provide a low cost storage solution because they aggregate storage from edge devices in the network (e.g. computers, laptops, and smart-phones); (iii) using peer-to-peer systems to build employee-to-employee storage systems enables a user at an enterprise to have control of the data; (iv) peer-to-peer systems reduce the costs required when using a dedicated infrastructure; (v) a subclass of peer-to-peer systems that has emerged that exploits the trust relationship amongst friends during the data placement decision, but provides only a limited definition of trust, considering only the social link, that is, the relationships between co-workers; and/or (vi) in an enterprise environment, the definition of trust should be extended to multiple, different levels of trust.

Figure 2:
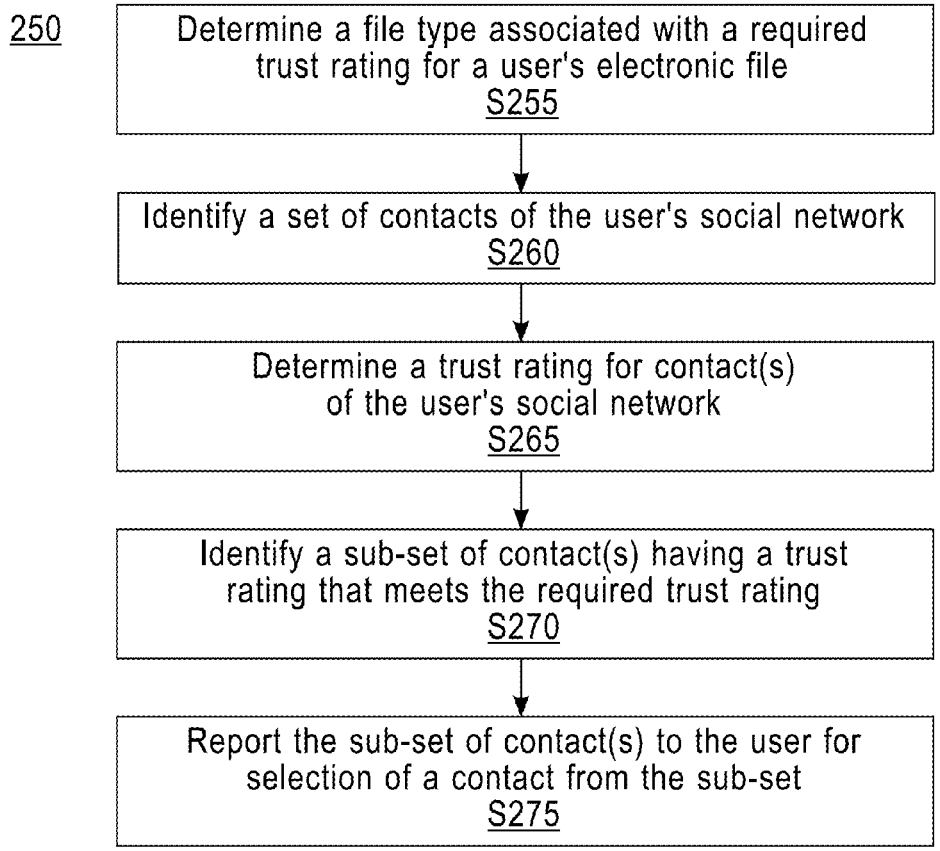
FIG. 2 is a flowchart showing a method performed, at least in part, by the first embodiment system.
Figure 3:
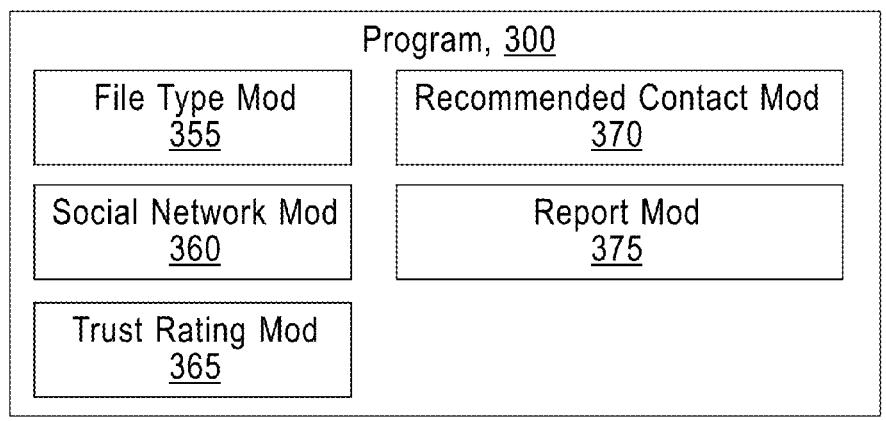
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where file type module 355 determines a file type associated with a required trust rating for a user's electronic file. In this example, the user assigns a file type from among a pre-determined set of file types. Alternatively, the user creates a set of file types from which to select. Alternatively, the file type is assigned by corporate policy, based on pre-determined criteria for various files to be stored in the data storage network. File types may include, for example: (i) personal; (ii) public; (iii) confidential; and/or (iv) top secret.

Processing proceeds to step S260, where social network module 360 identifies a set of contacts within the user's social network for possible data storage. In this example, networked computers system 100 includes a set of sub-systems of socially connected individual college students taking courses in physics. The social network module identifies contacts from within the network who are available for providing remote storage resources. Those identified may be the entire set of all contacts who have available resources, or may be a sub-set selected based on pre-determined criteria. The pre-determined criteria may be, but are not limited to: (i) contacts who already store data for the user; (ii) contacts who have not stored data for the user; (iii) contacts who have recently increased their assigned storage size for sharing with the network; and/or (iv) contacts who have recently stored data on user's local storage 302. In this detailed description, the terms peer and member may also refer to a "contact" as used in this example.

Processing proceeds to step S265, where trust rating module 365 determines a trust rating for the set of contacts identified in step S260. In this example, a trust rating is initially determined according to the user's input. That is, the user inputs a trust rating for each contact within the user's network. In this step, the trust rating module retrieves the trust rating assigned to each identified contact. A trust rating may be: (i) unknown trust; (ii) no trust; (iii) marginal trust; and/or (iv) full trust.

In alternative embodiments, including example embodiments discussed below, a determination of the trust rating is based on inputs collected by a recommendation module. Inputs include the trust level factors identified above. Each trust level factor is weighted such that a normalized score is determined. In some embodiments, the normalized score assigned to the contacts within the storage network is identified by the trust rating module and associated with the pre-determined trust level that corresponds to the trust score.

Processing proceeds to step S270, where recommended contact module 370 identifies a sub-set of contacts having a trust rating that meets the required trust rating for the file to be stored. For example, a file having the type "top secret" may require a storage location having a trust rating of "full trust." In this example, the user establishes the correlation between "file type" and "trust rating." Alternatively, corporate policy specifies a correlation between file type and trust rating. Alternatively, the user assigns to a given file, in step S255, a trust rating instead of the file type. Such embodiments do not require a correlation to be established between file type and trust rating.

Processing ends at step S275, where report module 375 reports the sub-set of contacts to the user for selection of contacts to be used for storage. In this example, the reported contacts are presented digitally with corresponding radio selection buttons for user selection of one or more of the contacts. Alternatively, the user is provided a printed report for review. Alternatively, the user inputs the number of locations to be used for storage and the report module operates to store the file in one or more of the appropriate locations and reports to the user which of the contacts are now storing the file.

Further embodiments of the present invention are discussed in the paragraphs that follow with reference to FIGS. 4-10.

Figure 4:
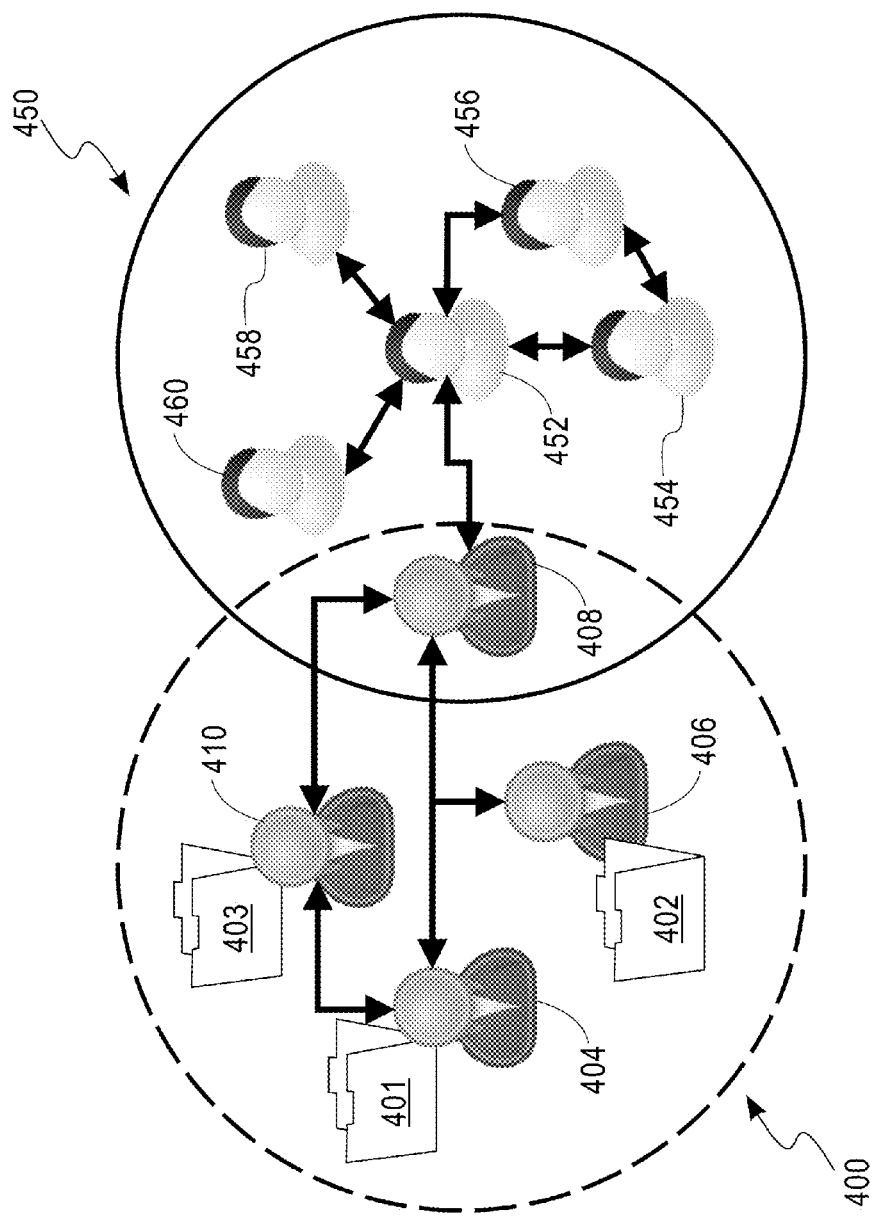
FIG. 4 is a peer-to-peer storage system according to an embodiment of the present invention.

FIG. 4 shows peer-to-peer storage system 400 according to an embodiment of the present invention. The example that follows will be referred to throughout this discussion to provide a clear understanding of the operation of an embodiment of the present invention. In this example, Project A employee 404 registers in the enterprise's social platform, enabling a social connection to registered Project A co-workers 406, 408, and 410. Project A co-worker 408 is also connected socially with Marketing co-workers 452, 454, 456, 458, and 460 in peer-to-peer network 450. Now, Employee 404 has document 401, related to Project A, and wants to upload and store that file in peer-to-peer storage system 400, document 401 may be stored in one or more computing devices that belong to any of co-workers 406, 408, and 410, who participate in the enterprise's social platform and are connected to employee 404. In this way, the co-workers connected by the peer-to-peer network make up peer-to-peer storage system 400 using the storage from their computers, for example 402 and 403.

Figure 5:
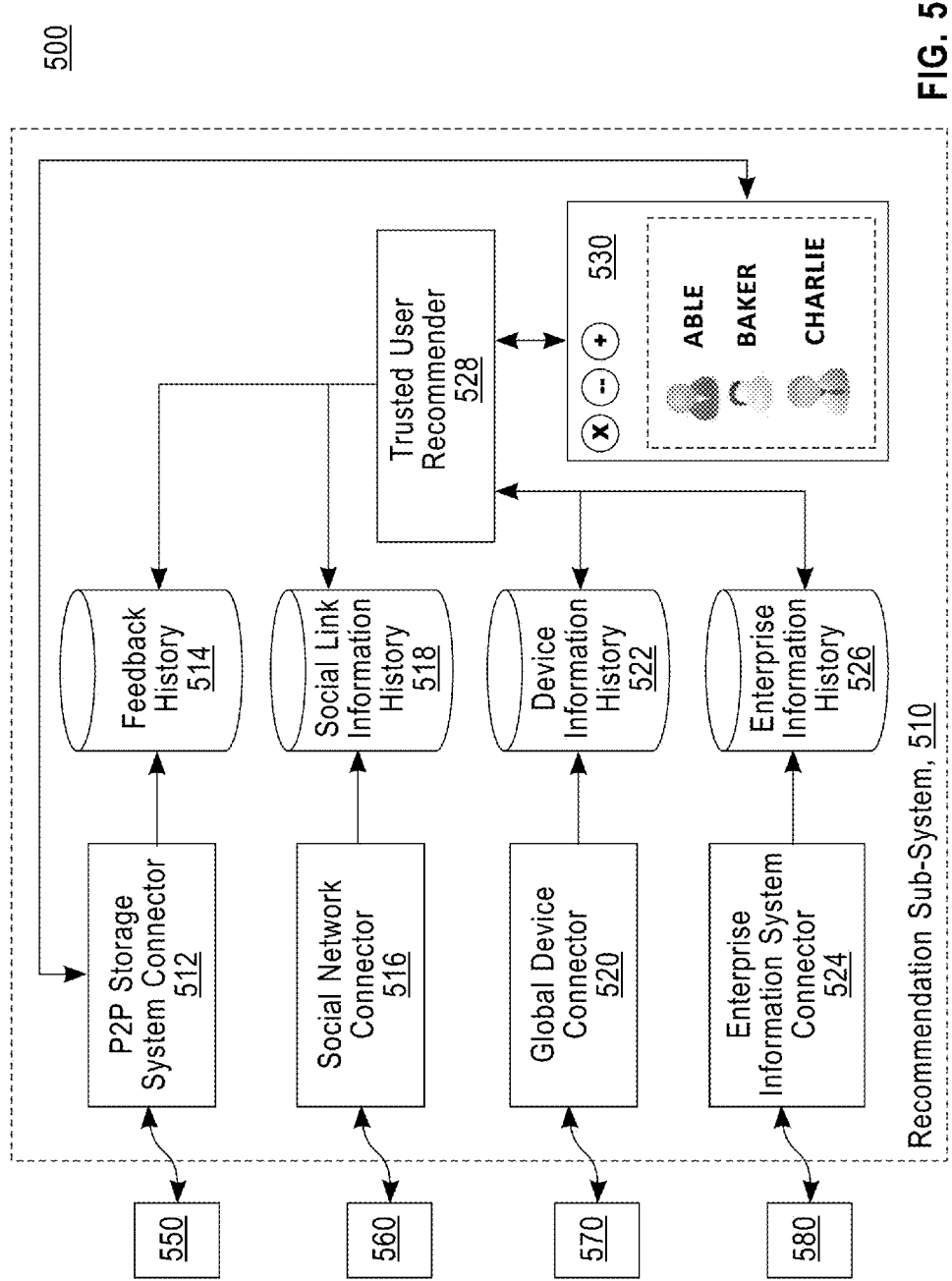
FIG. 5 is a schematic view of a second embodiment of a system according to the present invention.

FIG. 5 is a functional block diagram of recommendation system 500 according to an embodiment of the present invention. Recommendation system 500 includes: recommendation sub-system 510; peer-to-peer storage system(s) 550; social network(s) 560; user device(s) 570; and information system(s) 580. Recommendation sub-system 510 may include the usual components that a server, or share IT infrastructure, may offer. Further, recommendation sub-system 510 is operated by a user who is connected to a peer-to-peer network making up a peer-to-peer storage system, and includes: peer-to-peer storage system connector 512; feedback history database 514; social network connector 516, social link interaction history database 518; global device connector 520; device information history database 522; enterprise information system connector 524; enterprise information history database 526; trusted user recommendation module 528; and recommended contact user interface 530.

The various components of FIG. 5 will now be discussed. Peer-to-peer storage system connector 512 sends a ranked list of recommended users having a corresponding trust score to store a specified file. Continuing with the above example, the storage system connector sends Project A employee 404 (FIG. 4) a recommended list of contacts for storing data 401 on their local storage allocated to the storage system. The contacts are identified according to their respective trust score and, in this example, provided in a ranked order from more preferred to less preferred. Alternatively, the list of recommended contacts is in order of frequency of use. Alternatively, the list of recommended contacts is in order of available storage space. The storage system connector receives feedback from the user, Project A employee 404, via a user interface, further discussed and illustrated below. In this example, the storage system connector also provides the Project A employee with each recommended contacts' storage activities, such as type and size of files stored, and the types of files that the contact uploads to the storage system, such as top-secret, confidential, public, and personal.

Feedback history database 514 stores feedback information related to the level of trust of contacts who provide storage in the storage system. The storage system uses both the individual levels of trust of each contact and the trust score assigned to each contact by users within the network (e.g. unknown, none, marginal and full). The individual level of trust information is particularly useful when a new contact joins the storage system and does not have any initial feedback from other contacts. Basically, the storage system uses the feedback from other users at a later time, to refine the contact's trust score. In this example, the feedback history component also stores the activities of the various contacts, for example, the type of files (personal to top-secret), and the size and number of files stored. This can be used by other users to raise, or decrease, the assigned trust score. For example, if it is the first time that the user uses the storage system, the user sees the overall trust level that other users have assigned and use the activity information to increase or decrease the trust level of that contact.

Social network connector 516 retrieves social link interaction information from the enterprise social network, for example, peer-to-peer storage system 400 and stores in the social link interaction in a local database, shown as social link interaction history database 518. The interaction database is the store for social relationship information including: (i) the existence of user-to-user relationships; (ii) "social distance" between users in the network; (iii) number of interactions between certain users in the network; (iv) type(s) of user-to-user relationships (e.g. common projects, interest groups); and/or (v) duration of user-to-user relationships.

Global device connector 520 receives network and/or storage information collected from each component device, at the device side, used by contacts, or users, within the network. Device information history database 522 stores the network and/or storage information (such as information about a user's device applications and/or the user's interactions received from the global device connector). This network and/or storage information is also used to automatically raise or decrease the trust level score of a given user.

Enterprise information systems connector 524 connects to different information systems inside the enterprise. In this way, the information systems connector accesses and retrieves information including: (i) information technology (IT) technical support data; (ii) the number of reported issues including hardware or software problems; (iii) the nature of reported issues; (iv) reports of lost or stolen devices including serial number(s) and situational information; (v) role(s) and responsibility(ies) of users inside the enterprise (e.g., trainee, junior, senior, manager, vice president); (vi) seniority with the enterprise, or tenure; (vii) user work location (home office, etc.); (viii) user behavior (e.g, achievement awards, disciplinary actions); (ix) whether a user leaves the device at the enterprise (an indication of reliability); (x) work schedules, such as frequent travel demands, or regularly works at the home office (frequent travel may indicate that the device degrades more quickly, or that it may likely be misplaced, or likely subject to theft).

Trusted user recommender 528 retrieves a list of contacts from within the uploading user's social link interaction database, such as database 518. Based on the list of contacts, the recommender retrieves trust level information corresponding to each of the contacts, or a sub-set thereof, from: (i) the feedback history; (ii) the device history; and/or (iii) the enterprise history. A weighting scheme is applied to the trust level information according to the relevance that the information has to the trustworthiness of the storage device and/or storage device owner. The resulting trust score is the basis for creating a ranked list of contacts providing storage resources to the network. The recommendation reflects the type of file to be uploaded, or stored (i.e., the minimum trust level, or trust score, required for the specified file). The weighting scheme is adjusted and/or improved over time by means of a feedback mechanism that better represents information provided by the uploading user.

Some embodiments of the present invention are directed to a periodic trust level, or trust score, update. In that way, recommendations are made without continuous trust level updates.

Figure 6:
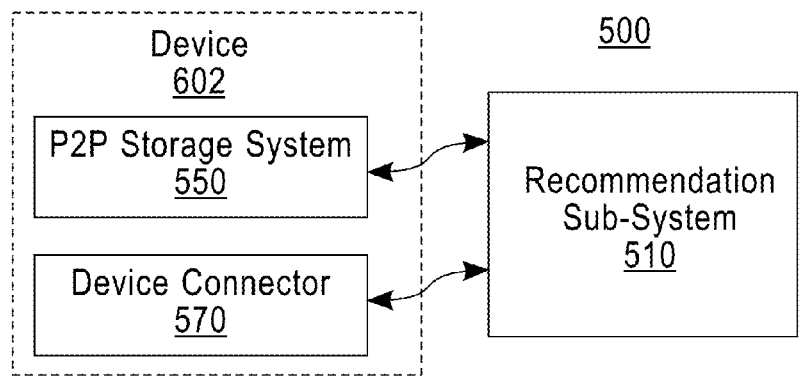
FIG. 6 is a schematic view of a first portion of the second embodiment system.

FIG. 6 shows device 602 within sub-system 500 and in communication with recommendation sub-system 510. Device 602 includes: peer-to-peer storage system 550; and device connector 570.

Device connector 570 gathers trust score information related to security and user interactions with device 602 from the perspective of both (i) application(s) and (ii) operating system. In this example, the gathered information is stored in device 602 and is synchronized periodically with recommendation sub-system 510 to generate a ranked list of contacts for making a recommendation. Alternatively, the trust score information is sent directly to the recommendation sub-system for off-loading from the device 602 and subsequent consumption by the storage system.

Trust score information includes: (i) security mechanisms used in device 602; (ii) malware detection applications; (iii) virus detection applications; (iv) backup system(s) used in the device; (v) backup destination(s); (vi) backup disk(s) and/or partition(s); (vii) backup frequency (both actual and scheduled).

Peer-to-peer storage system 550 connects with other users to establish a peer-to-peer network. The storage system allows users to store and/or retrieve files and other data with the device(s) of other users, or contacts, in the network. In this way, when a user wants to store a new file, the storage system requests of the recommender sub-system a ranked list of trusted contacts for storing the new file for sending a specified type of file (such as top-secret, confidential, public, and personal).

Figure 7:
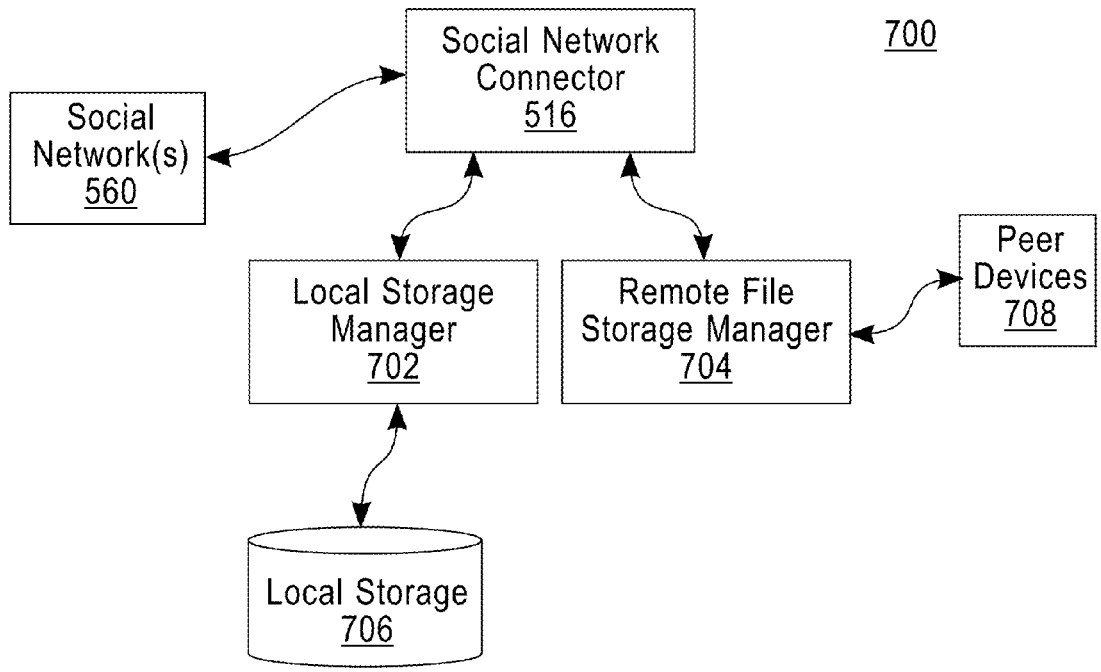
FIG. 7 is a schematic view of a second portion of the second embodiment system.

FIG. 7 shows portion 700 of sub-system 500, where social network connector 516 operates to transfer data from local storage 706 using contact storage in peer devices 708. Portion 700 also includes: social network(s) 560; local store manager 702; and remote file storage manager 704. The social network connector accesses local storage 706 via the storage manager. When the user identified particular file(s) for storage, the social network connector determines the designated file types and establishes storage paths via remote file storage 704 to store the file(s) with one or more contact having the appropriate trust rating for the specified file(s).

It should be noted that the amount of storage used in the storage system may be configured by a system administrator according to pre-determined policy. In some embodiments of the present invention, the storage configuration is adjusted automatically according to a current need for storage having a particular trust level.

Figure 8:
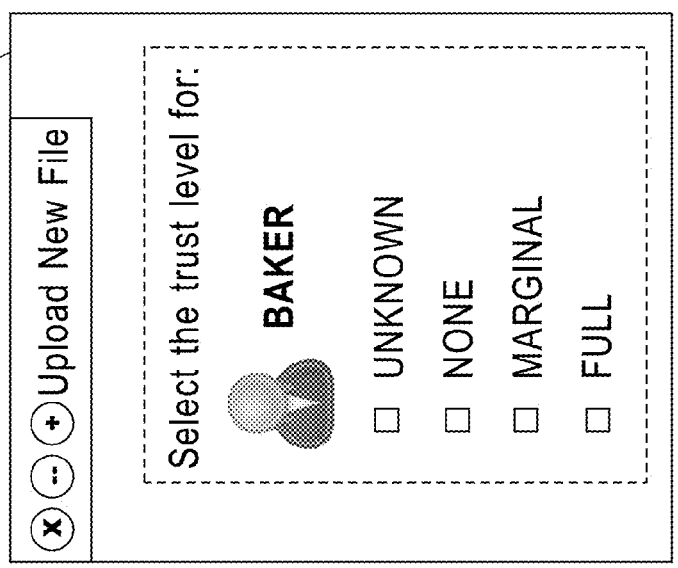
FIG. 8 is a first screenshot view according to the present invention.

FIG. 8 depicts user interface screenshot 800 for user-selection of a trust level for the contact Baker. In this example, for a selected user, the file owner defines or edits the trust level. The selections available to the user in this illustration are "unknown," "none," "marginal," and "full." The user may select one of these trust levels according to the following brief description. For the "unknown" trust level, the user does not know the contact, and, therefore, does not trust any type of document for storage in the contact's local storage. For the "none" trust level, the user knows the contact, but does not trust the contact with files other than public file types. For the "marginal" trust level, the user knows the contact personally and trusts the contact for storing confidential file types. For the "full" trust level, the use know the contact personally and trusts the contact with any file type, including top secret file types.

This option to modify the trust level of contacts may be used as a feedback mechanism to refine a recommendation. For example, a contact is connected through the enterprise social network with another user, so the user knows the contact, but he does not trust that contact to store confidential files. The user may update the trust information any time, since a user may not trust the contact simply because the contact is unknown. In that way, the next time the user uploads a file, the system will use the updated information to recommend, for example, a different set of contacts.

Figure 9:
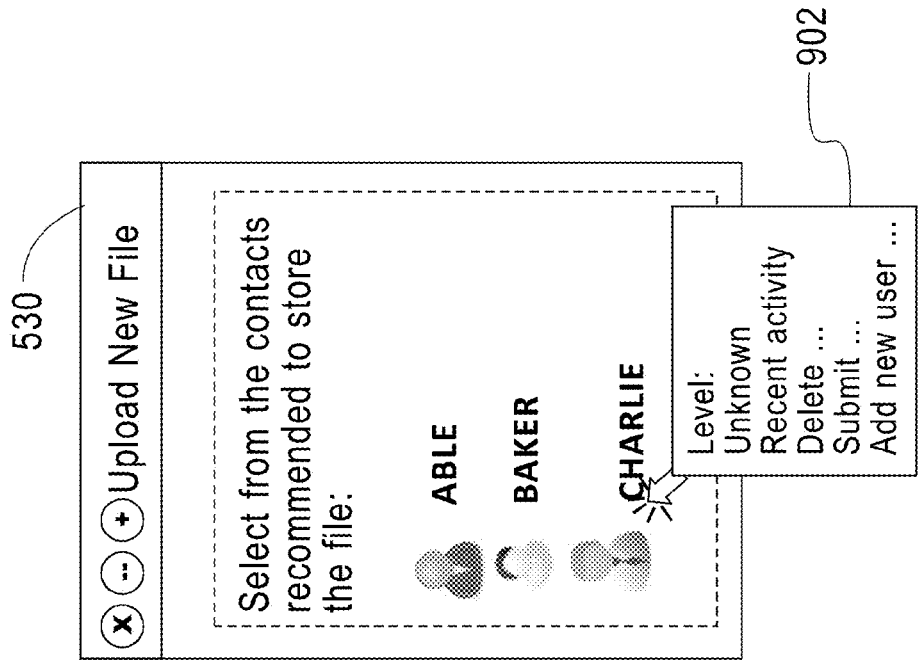
FIG. 9 is a second screenshot view according to the present invention.

FIG. 9 depicts a screenshot of recommended contact user interface 530 for user-selection of contact(s) for storing a specified file to the contact's local storage. In order to determine which contacts will store the user's file, for this example, the system leverages the trust relationship between contacts based on their social relationship. In some embodiments, the system uses external information (e.g., from the user device and/or the enterprise information systems) in order to minimize the risk of data loss or corruption. When a user wants to upload a new file, the user specifies the confidentiality level of the file that will be stored. This information will be used to identify the minimum trust level required to store the file. This example avoids the issue where some contacts are more likely to be chosen and other contacts may never be chosen by the user. For example, a file that a user downloaded from the web may be classified as public. In this case, the user that will store the file with a contact that does not need to be reliable, or have a high trust level. On the other hand, a contract with a client can be classified as top-secret and the file should only be stored with a contact having a high trust level, perhaps even a contact who is also involved in the deal. Once the system generates a list of recommended contacts for storing the file, the user may select all, remove a contact, or add a new user, as illustrated in pop up 902.

A user may also view the recent activities of a contact. In that way, it is possible to know, for a selected contact, which types of files (personal/top secret) are being stored with that contact. This information may result in the raising or lowering of the trust level for that contact. Additionally, users may see the overall reputation of a contact (unknown, none, marginal, or full). For example, in pop up 902, the overall reputation for Charlie is unknown (Charlie may be a new user in the system or new employee). These additional view options may help first time users, who are not aware of which contacts are trustworthy.

Another method according to the present invention is as follows: (i) receive a new upload request of file F, having a trust score Fscore, associated to its file type (top secret, confidential, personal, or public) from a user Uf; (ii) retrieve the social network of user Uf that contains the contacts connected to user Uf and social link interaction history Si; (iii) for each user Ui connected to user Uf in the social network use the information from social link interactions history Si to apply a weight and calculate the score Sui; (iv) for each contact Ui connected to user Uf in the social network, where there is no feedback information provided by the user Uf about the contact Ui, use the information from the global feedback value provided by other contacts to apply a weight and calculate the score Sfi; (v) for each contact Ui connected to user Uf in the social network, where there is feedback information provided by the user Uf about contact Ui, retrieve the feedback information provided by the user Uf or the file owner to contact Ui to apply a weight and calculate the score Sfi; (vi) use information from device information history for contact Ui to apply a weight and calculate the score Sdi; (vii) use information from enterprise information history for contact Ui to apply a weight and calculate the score Sei; (viii) calculate a final score Uscore from Sui, Sfi, Sdi, and Sei for contact Ui; (ix) if Uscore>=Fscore, add contact Ui to a list Li along with the score Uscore; (x) rank list Li based on contact scores; and (xi) display the ranked list Li of contacts.

Some embodiments of the present invention may include one, or more, of the following features, characteristics, and/or advantages: (i) reduction of service cost by exploiting the unused storage space from the computers, laptops, and/or smart phones of other users in the network; (ii) improved resilience to correlated failures due to decentralization of the storage system; (iii) leverages trust relationships between users in a social network to enable storage sharing; (iv) improved privacy and security over public cloud storage systems; and/or (v) extends the definition of trust to multiple, different levels of trust within a given network storage system.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    determining a file trust level associated with a file to be stored by a first user on a local storage device of a second user;
    identifying a set of storage devices within a networked computers system including a plurality of computer systems and the local storage device of the second user, the set of storage devices being local storage devices on corresponding computer systems of the plurality of computer systems;
    assigning a storage trust level to the local storage device based on a set of social link interaction information as an indicator of trustworthiness of a computer system to which the storage device corresponds, the storage trust level being a threshold trust level for storing data on the storage device; and
    determining a subset of qualifying storage devices within the set of storage devices, a qualifying storage device having a storage trust level that matches the file trust level;
    wherein:
    the set of social link interaction information corresponds to a relationship between the first user and the second user;
    the storage trust level is one of a set of storage trust levels including a lower level and an upper level, the upper level indicating more trustworthiness than the lower level; and
    at least the identifying and determining steps are performed by computer software running on computer hardware.

2. The method of claim 1, wherein:
    the networked computers system is a peer-to-peer network; and
    the first user and the second user are members of the peer-to-peer network.

3. The method of claim 1, wherein:
    the file trust level is an initial trust level input by an owner of the file.

4. The method of claim 1, further comprising:
generating a user interface that provides for user-input to assign a storage trust level to a storage device residing on a specified computer system within the networked computers system.

5. The method of claim 1, wherein:
assigning a storage trust level to the local storage device is further based on a trust level factor associated with a set of enterprise information of the second user, an enterprise information being a project in which the second user participates;
wherein:
the file relates to the project; and
the storage trust level increases for the storage device with respect to other storage devices in the set of storage device that do not include the enterprise information.

6. The computer program product of claim 5, further comprising:
fifth program instructions programmed to retrieve technical support data for the plurality of computer systems including reported hardware incidents;
wherein:
assigning the storage trust level to each storage device is further based on the technical support data.

7. The method of claim 1, further comprising:
storing the file on the qualifying storage device.

8. The method of claim 1, further comprising:
retrieving technical support data for the plurality of computer systems including reported hardware incidents;
wherein:
assigning the storage trust level to each storage device is further based on the technical support data.

9. A computer program product comprising a computer readable storage medium having stored thereon:
first program instructions programmed to determine a file trust level associated with a file to be stored by a first user on a local storage device of a second user;
second program instructions programmed to identify a set of storage devices within a networked computer system including a plurality of computer systems and the local storage device of the second user, the set of storage devices being local storage devices on corresponding computer systems of the plurality of computer systems;
third program instructions programmed to assign a storage trust level to the local storage device based on a set of social link interaction information as an indicator of trustworthiness of a computer system to which the storage device corresponds, the storage trust level being a threshold trust level for storing data on the storage device; and
fourth program instructions programmed to determine a subset of qualifying storage devices within the set of storage devices, a qualifying storage device having a storage trust level that matches the file trust level;
wherein:
the set of social link interaction information corresponds to a relationship between the first user and the second user;
the storage trust level is one of a set of storage trust levels including a lower level and an upper level, the upper level indicating more trustworthiness than the lower level.

10. The computer program product of claim 9, wherein:
the networked computers system is a peer-to-peer network; and
the first user and the second user are members of the peer-to-peer network.

11. The computer program product of claim 9, wherein the file trust level is an initial trust level input by an owner of the file.

12. The computer program product of claim 9, further comprising:
fifth program instructions programmed to generate a user interface that provides for user-input to assign a storage trust level to a storage device residing on a specified computer system within the networked computers system.

13. The computer system of claim 12, further comprising:
fifth program instructions programmed to retrieve technical support data for the plurality of computer systems including reported hardware incidents;
wherein:
assigning the storage trust level to each storage device is further based on the technical support data.

14. The computer system of claim 12, further comprising:
fifth program instructions programmed to store the file on the qualifying storage device.

15. The computer program product of claim 9, wherein:
assigning a storage trust level to the local storage device is further based on a trust level factor associated with a set of enterprise information of the second user.

16. A computer system comprising:
a processor(s) set; and
a computer readable storage medium;
wherein:
the processor set is structured, located, connected, and/or programmed to run program instructions stored on the computer readable storage medium; and
the program instructions include:
first program instructions programmed to determine a file trust level associated with a file to be stored by a first user on a local storage device of a second user;
second program instructions programmed to identify a set of storage devices within a networked computer system including a plurality of computer systems and the local storage device of the second user, the set of storage devices being local storage devices on corresponding computer systems of the plurality of computer systems;
third program instructions programmed to assign a storage trust level to the local storage device of the set of storage devices based on a set of social link interaction information as an indicator of trustworthiness of a computer system to which the storage device corresponds, the storage trust level being a threshold trust level for storing data on the storage device; and
fourth program instructions programmed to determine a subset of qualifying storage devices within the set of storage devices, a qualifying storage device having a storage trust level that matches the file trust level;
wherein:
the set of social link interaction information corresponds to a relationship between the first user and the second user;
the storage trust level is one of a set of storage trust levels including a lower level and an upper level, the upper level indicating more trustworthiness than the lower level.

17. The computer system of claim 16, wherein:
the networked computers system is a peer-to-peer network; and the first user and the second user are members of the peer-to-peer network.

18. The computer system of claim 16, wherein the file trust level is an initial trust level input by an owner of the file.

19. The computer system of claim 16, further comprising:
fifth program instructions programmed to generate a user interface that provides for user-input to assign a storage trust level to a storage device residing on a specified computer system within the networked computers system.

20. The computer system of claim 16, wherein:
assigning a storage trust level to the local storage device is further based on a trust level factor associated with a set of enterprise information of the second user.

* * * * *